United States Patent [19]

Howe et al.

[11] Patent Number: 4,696,119
[45] Date of Patent: Sep. 29, 1987

[54] ANIMAL IDENTIFICATION DEVICE AND APPLICATOR THEREFOR

[75] Inventors: Steven R. Howe, Longmont; Phillip D. Howe, Berthoud, both of Colo.

[73] Assignee: An-Tech International Livestock Products, Inc., Phoenix, Ariz.

[21] Appl. No.: 638,983

[22] Filed: Aug. 8, 1984

Related U.S. Application Data

[63] Continuation-in-part of Ser. No. 402,910, Jul. 29, 1982, abandoned.

[51] Int. Cl.⁴ .............................................. G09F 3/00
[52] U.S. Cl. ..................................... 40/301; 128/330
[58] Field of Search ................. 40/300, 301; 128/330; 63/12

[56] References Cited

U.S. PATENT DOCUMENTS

| | | | |
|---|---|---|---|
| 2,184,060 | 12/1939 | Singer | 63/3 |
| 3,731,414 | 5/1973 | Murphy et al. | 40/301 |
| 4,147,168 | 4/1979 | Hayes et al. | 128/330 |
| 4,209,924 | 7/1980 | Fearing | 40/301 |
| 4,368,735 | 1/1983 | Filmer | 128/330 |
| 4,497,321 | 2/1985 | Fearing et al. | 128/330 |

FOREIGN PATENT DOCUMENTS

| | | | |
|---|---|---|---|
| 11261 | 10/1968 | Australia . | |
| 31227 | 7/1981 | European Pat. Off. | 40/301 |
| 2830401 | 8/1979 | Fed. Rep. of Germany | 40/301 |
| 2412258 | 8/1979 | France | 40/300 |
| 2597 | of 1903 | United Kingdom | 128/330 |
| 2118822 | 11/1983 | United Kingdom | 63/12 |

Primary Examiner—Gene Mancene
Assistant Examiner—Cary E. Stone
Attorney, Agent, or Firm—H. B. Van Valkenburgh; Bruce G. Klaas

[57] ABSTRACT

Undulations in ear side of tag, such as alternating ribs and troughs, permit air flow to area around stem of pin having conical head or point. Hole leading to socket well is larger than pin stem and the socket well is larger than the large end of the pin head to permit air flow to ear as well as permitting tag to move around pin to maintain air passages clear. Pin has a soft plastic base attached to stem opposite conical point and a hard plastic button larger than head of pin, surrounded by soft plastic. Pin stem has groove at button, which has holes and convex undersurface. Applicator has opposed arms on pivoted handles, one arm having a laterally enlarged platform with a rim on both sides and at rear, the latter to position the pin base longitudinally. Spring clip engages pin base and has slot to laterally position pin stem. Opposite arm has rimless surface engaged by tag head, to permit different angular tag positions, for about 260°. Longitudinal notch is opposite rimless surface and permits pin head to pass through during installation, while ledge around notch abuts end of socket and perpendicular wall, around ledge, positions tag head in alignment with pin. Platform on one arm and rimless surface on the other arm are divergent with respect to pivot axis of arms prior to installation but convergent when arms are moved to closed position.

16 Claims, 19 Drawing Figures

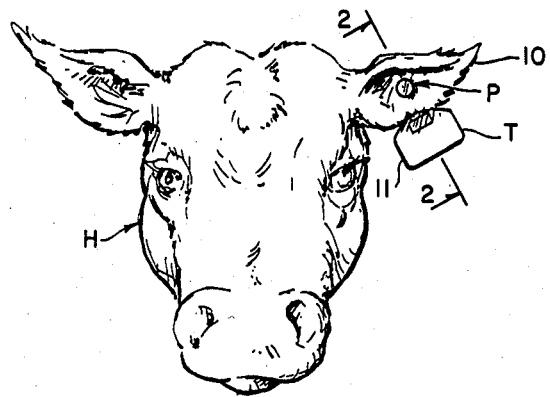
FIG. 1
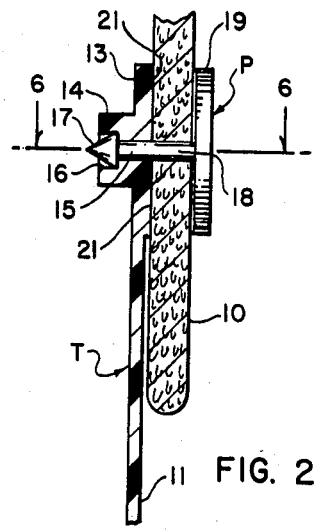
FIG. 2
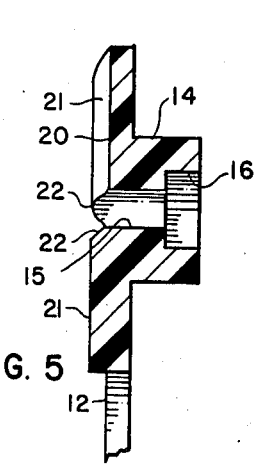
FIG. 5
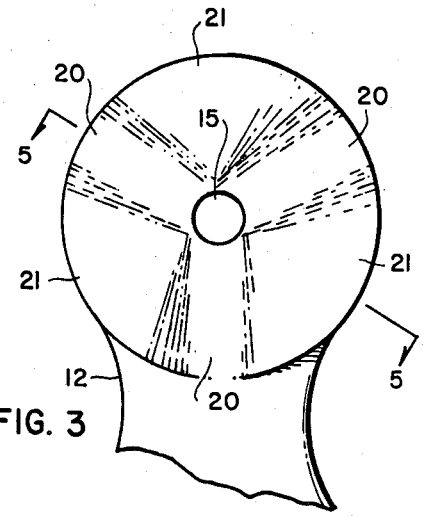
FIG. 3
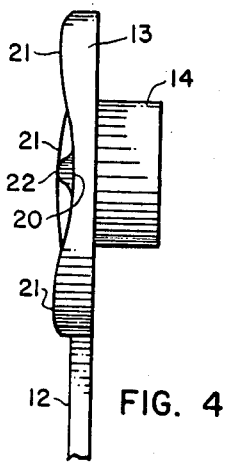
FIG. 4
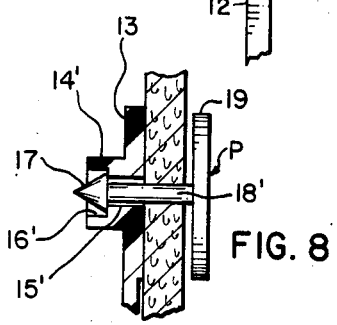
FIG. 8
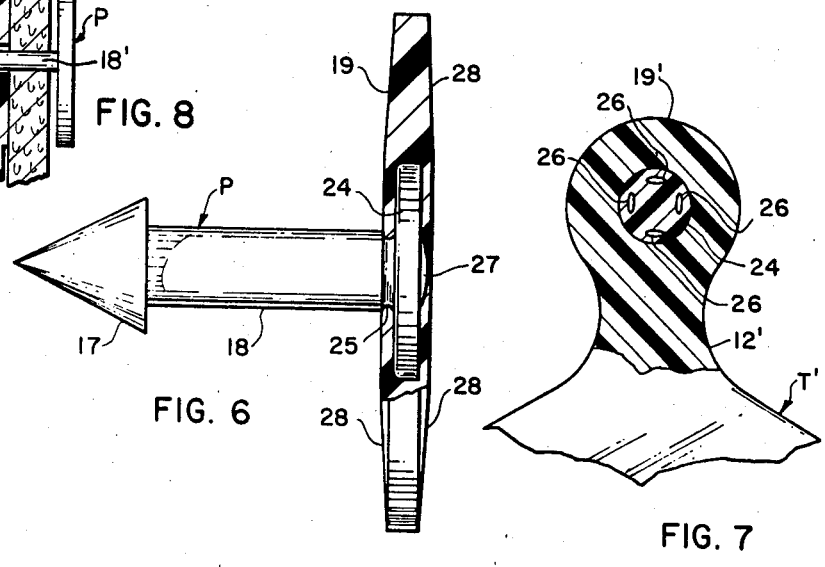
FIG. 6
FIG. 7

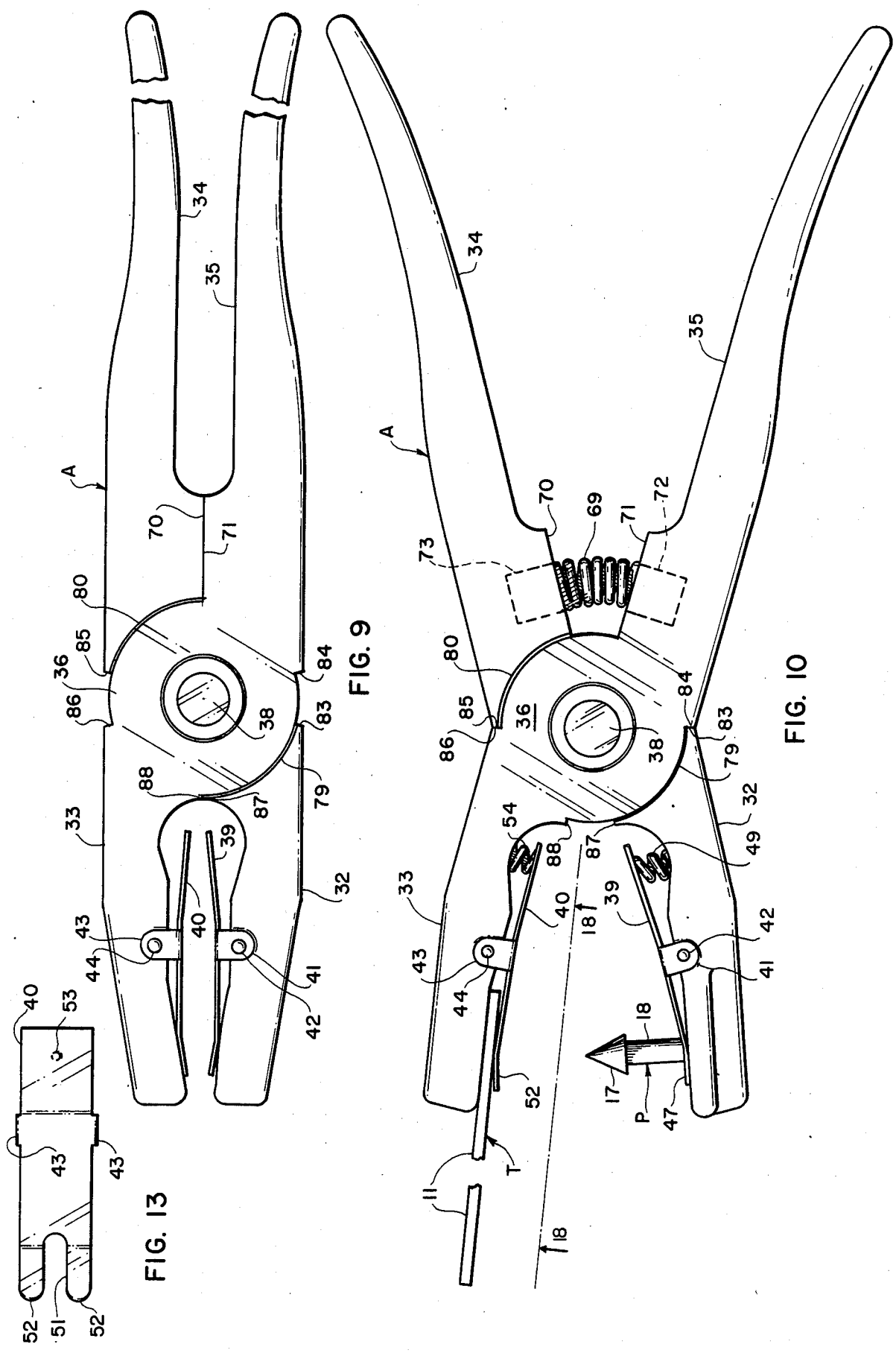

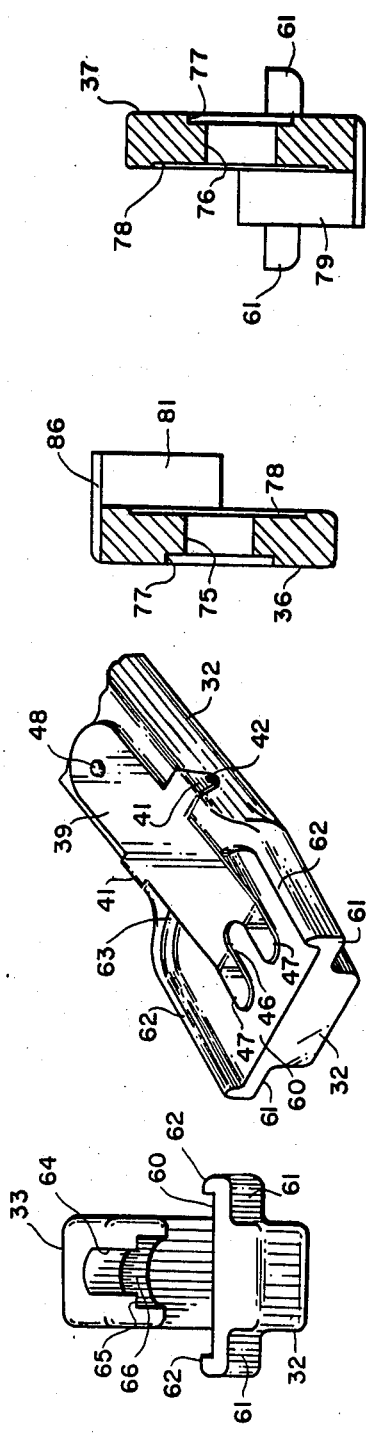
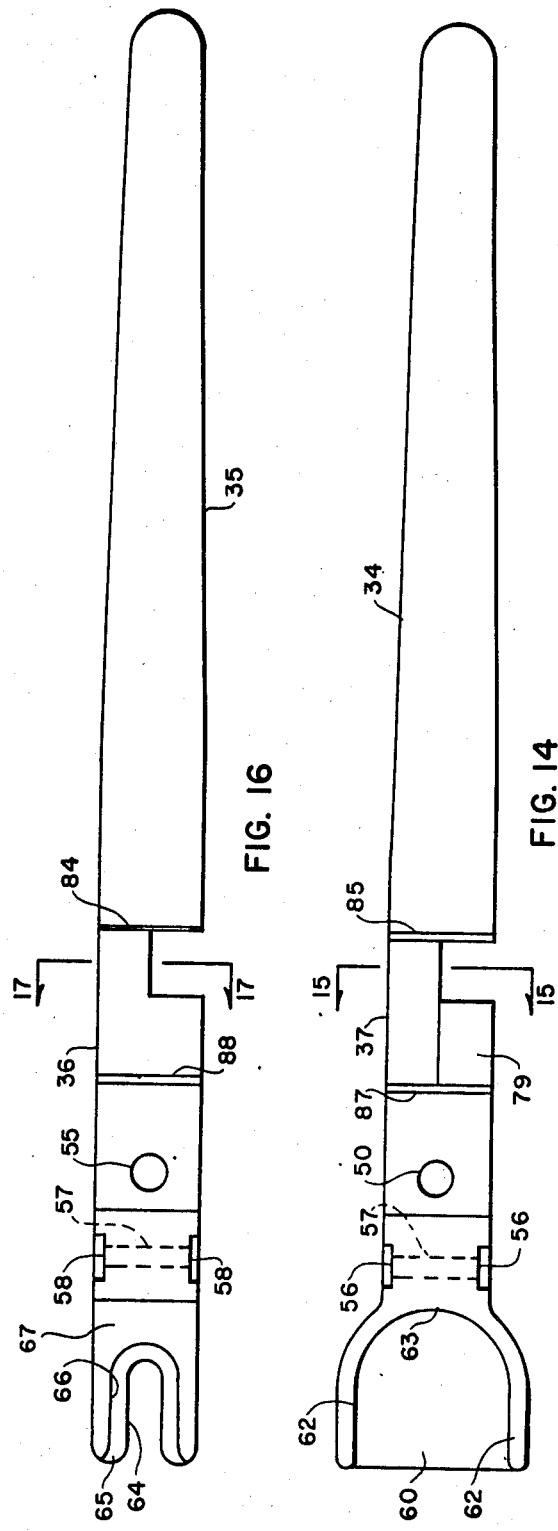

ANIMAL IDENTIFICATION DEVICE AND APPLICATOR THEREFOR

This application is a continuation-in-part of our application Ser. No. 402,910, filed Jul. 29, 1982, now abandoned.

This invention relates to animal identification devices and applicators therefor.

BACKGROUND OF THE INVENTION

Identification devices are used for numerous types of animals, including cattle, cows, sheep and swine, and have been used for a number of years. Earlier devices included metal clips which were pressed onto the ear of the animal. The identification device of the Norman J. Hayes U.S. Pat. No. 3,260,007, which has become known throughout the United States and in other countries, comprises the combination of a pin and a tag. The tag, formed of a softer plastic, is provided with a body on which numbers or other identifying indicia may be placed, connected by a neck with a socket on the outside of the tag and a hole extending to said socket. The pin, formed of harder plastic, is provided with a conical point at one end of a stem, with an annular base at the opposite end of the stem. An applicator, which operates similarly to a pair of pliers, is provided with a spring clip for holding the base of the pin against one arm of the applicator, with the opposite arm receiving the socket, with the ear of the animal between the conical point of the pin and the tag. The handles of the applicator are moved together to move the arms toward each other, so that the conical point of the pin will be forced through the ear, then into the hole in the tag and finally into the socket, to retain the tag and pin together. One disadvantage of the pin formed entirely of hard plastic, necessary to provide sufficient hardness and strength to permit the conical point and stem of the pin to be forced through the ear and into the socket of the tag, has been the fact that since the base of the pin, which engages the ear of the animal, rather than yielding somewhat with movement of the ear, remains rigid and thereby tends to irritate the ear. This may produce a wound which may become infected. An additional problem, albeit at times somewhat minor in nature, is the fact that, as the conical point of the pin passes through the ear, flesh from the hole is pushed toward the side of the ear adjacent the tag. Although the tag is formed of soft plastic and therefore does not tend to irritate the ear as much as a hard plastic part would, the wound at the exit end is more pronounced than at the entrance end, due to the tendency for flesh to be pushed through the hole in the ear. Thus, a close fitting tag may tend to retard the circulation of air to the wound at the exit end of the hole in the ear, thereby slowing the process of healing and increasing the possibility of infection. Of course, with the socket on the outside, the tag will lie flat against the ear, thereby reducing the possibility of the tag being caught by a fence, tree limb or the like and tending to pull out of or damage the animal's ear.

Additional types of tages and applicators have been developed, including that of Murphy et al, U.S. Pat. No. 3,812,859, which utilizes a spring clip of a type similar to that of U.S. Pat. No. 3,260,007 to hold a socket end of a tag mounted on one arm of the applicator, and a piercing and support needle mounted on the opposite arm of the applicator. This needle engages a central hole in a pin which is formed of soft plastic but which must be reinforced by the needle in order to pierce the ear and which also must be provided with a conical metal ring at the outer end of the conical tip, so that the extreme end of the piercing needle will first penetrate the ear, followed by the metal ring and then the remainder of the pin. The pin may be a separate pin, or may be molded integrally with another tag, also formed of soft plastic. Although this construction permits the soft plastic to engage the ear at the entrance end of the hole to the ear, the applicator must be disinfected between each installation of the tag. The tip of the piercing and support needle enters the ear of each animal in turn, so that any infection or the like present in one animal is likely to be carried to another animal. The inconvenience of dipping the applicator in an antiseptic solution between each installation of an identification device, as well as the inconvenience of carrying around the antiseptic solution in a container which must be opened to permit the stem of the applicator to be dipped into the solution and then closed to prevent the entry of dust, debris from an animal or the like, are both deterrents to the use of such a system. The socket for the pin is on the inside of the tag, thereby reducing the possiblility of infection due to lack of air circulation.

Another type of identification device is disclosed by Brierley, U.S. Pat. No. 4,021,952, which device includes a pair of tags, one of which is provided with a socket adjacent one end and the other of which is provided with a laterally extending stem formed integrally therewith. Each of these tags and the respective socket and stem are formed of soft plastic. The stem has an enlarged head and an axial hole, into which a metal pin having a conical tip may be slipped, with the base of the conical tip having a diameter corresponding to the enlarged head on the tag stem. The metal stem of the pin reinforces the stem of the tag, while the metal conical tip of the pin not only pierces the ear but also displaces the hole leading into the socket so that the enlarged head of the hollow stem of the second tag will enter the socket and retain the two tags together. The metal pin is removed after a tag is installed, by making the stem of the pin longer than the stem of the second tag so that the metal pin, after installation of the tag can be pushed from the opposite side of the ear to move the conical tip away from the socket. Thus, the conical tip can then be grasped by a workman and the installation pin removed. Of course, either the installation pin must be discarded after each installation or sterilized before reuse. The socket on the tag of the Brierley U.S. Pat. No. 4,021,952 is also placed adjacent the ear, so as to minimize the area of the tag which engages the ear around the hole produced by installation, thereby permitting better circulation of air to the wound at the exit end of the hole in the ear. However, such a socket, normally produced by a boss or ring having a thickness which is considerably greater than the thickness of the tag, spaces the tag from the ear a corresponding distance, thereby increasing the possibility of the tag catching on a fence wire or the like and becoming lost or producing damage to the ear of the animal.

A variation of the support type of tag stem is shown by Fearing, U.S. Pat. No. 4,209,924, in which a steel point, closed and conical, is molded to the end of a hollow neck or stem of soft plastic, while an installation rod, as on a tool, is inserted in the hollow neck to push the tip and stop through an ear, then remove the rod without the need for sterlization between tag installations.

An applicator having arms for receiving a spike and a tag having a hole to receive the spike is disclosed in Brierly, Australia Pat. No. 242,379 as having side stops which severely restrict radial positioning of the tag. Also, Oudenhoven U.S. Pat. No. 3,641,804 discloses an applicator having triangular jaws with edge flanges for both the pin and tag, thereby also severely restricting any radial variation in the position of the tag.

Among the objects of this invention are to provide a novel animal identification device; to provide a novel applicator particularly adapted for installation of such identification device; to provide such an identification device which includes a tag which is provided with a socket on the side opposite the ear for reception of the head of an attachment pin or the like; to provide such a tag having such a socket but which permits circulation of air to the wound at the exit end of the hole in the ear of the animal; to provide a novel pin which has a conical point on the stem of sufficient strength, such as corresponding to that of hard plastic, for penetration of the ear and attachment ot a tag having a socket therefor, but which is provided with a soft plastic surface at the base of the pin or of a second tag from which the pin extends; to provide such a pin which has a construction which readily transmits the force produced by an applicator for a tag and pin combination; to provide such an applicator which is particularly adapted to install the tag and pin of this invention; to provide such an applicator which more securely holds the pin or a second tag having a pin extending therefrom; to provide the combination of an applicator, tag and pin or second tag having a pin which avoids the necessity for sterlization of any part following installation; to provide such an applicator which more securely receives a tag having a socket on the side away from the ear of the animal; to provide such an applicator which permits a wide angle of positioning of the tag at various angles to the arm of the applicator on which mounted; and to provide each such tag with a socket, a pin with a conical point or tag provided with a stem having a conical point and applicator particularly adapted for installation of the tag and pin or dual tag combination, each of which is readily manufactures and operates in an effective and efficient manner.

SUMMARY OF THE INVENTION

An animal identification tag is provided with a socket having a well for receiving a conical point or the like of a stem of a pin, on the opposite side of the tag from an ear or the like of an animal. This tag is provided with a plurality of passages for permitting a flow of air to the area around the stem, to promote healing of a wound produced by the conical point when passing through the ear and perhaps extruding flesh from the hole so made. These passages may be provided by undulations, such as alternating troughs and ridges extending toward the hole on the side of the tag which abuts the ear. A loose fit between the stem of the pin and the hole leading to the socket, as well as between the inside of the socket and the large end of the conical point, assists in permitting air to pass to the area around the stem, as well as permitting the tag to move more freely on the pin and thereby tend to avoid being caught on brush, limbs or the like. An attachment pin, which extends from a base or from a base or from a head of a second tag, is formed of a hard material, such as plastic, and includes a stem extending from a conical point to a button which is imbedded in a softer plastic. The softer plastic engages the ear to reduce irritation sometimes produced by a hard plastic base of the pin. When the diameter of this button exceeds the diameter at the large end of the conical point, an applicator, which moves the pin in an arc, will transmit the force produced by it without the pin tipping and missing the hole in the tag, if the animal makes a sudden movement. To facilitate adherence of the soft plastic base to the hard plastic button, the stem has a groove adjacent the button, the side of the button opposite the stem is convex and the button has a series of circumferentially spaced holes. An applicator for installing the pin and tag has a pair of arms, connected across a common pivot joint to handles for opening and closing the arms. One arm has a platform for the pin, provided by laterally extending wings and a rim around each side and its rear which acts as a stop for the pin. Each arm has a clip with a front slot and a tab at each side of the slot for respectively engaging the base of the pin on one arm, and the head of a tag on the other arm. Each clip is pivotal by side flanges on a pin and engages a compression spring at the rear. The opposite arm has a longitudinal slot to receive the socket of the tag and a ledge around the socket engaged by the head of the tag. A perpendicular wall, around the ledge, engages the head of the tag to position the hole leading to the socket in alignment with the pin carried by the first arm. The opposite arm has a planar surface without a rim and at which the wall around the ledge terminates, which permits the tag to be turned to different radial positions for installation, being limited only by the side flanges of the clip on this arm.

THE DRAWINGS

FIG. 1 is a front elevation of the head of an animal, such as a steer or cow, to an ear of which an identification tag of this invention is attached by a pin of this invention.

FIG. 2 is a longitudinal section, taken along line 2—2 of FIG. 1 and on an enlarged scale, of the tag and pin installation and a portion of the ear of the animal.

FIG. 3 is a fragmentary rear elevation, on a further enlarged scale, of the head of the tag of FIG. 2.

FIG. 4 is an oblique top plan view, at 60° from vertical, of the portion of the tag shown in FIG. 3.

FIG. 5 is an oblique cross section taken along line 5—5 of FIG. 3.

FIG. 6 is a top plan view of the pin, with a base thereof in section, taken along line 6—6 of FIG. 2 and on a further enlarged scale.

FIG. 7 is a fragmentary elevation, showing the upper portion of a second tag which carries a pin of FIGS. 2 and 6, and on a reduced scale from that of FIG. 6 but partially in section taken at the position of line 7—7 of FIG. 6.

FIG. 8 is a cross section similiar to FIG. 2 but showing a loose fit between the pin and the hole in the tag leading to the socket, as well as between the socket and the large end of the conical point of the pin.

FIG. 9 is a side elevation, in closed position, of an applicator of this invention, particularly adapted for installation of the pin and tag of FIGS. 1-8.

FIG. 10 is a side elevation of the applicator of FIG. 9, in open position, with a pin and tag of this invention mounted therein, prior to installation of the pin and tag in the ear of an animal, with the tag being shown in condensed form.

FIG. 11 is a front end view of the applicator of FIG. 9.

FIG. 12 is a perspective view, on an enlarged scale, of the pin receiving end of one arm of the applicator of FIGS. 9 and 10.

FIG. 13 is a bottom plan view of a tag retaining clip of the tag receiving arm of the applicator of FIGS. 9 and 10.

FIG. 14 is a top plan view of the pin receiving arm of the applicator of FIGS. 9 and 10.

FIG. 15 is a transverse section taken along line 15—15 of FIG. 14.

FIG. 16 is a bottom plan view of the tag receiving arm of the applicator of FIGS. 9 and 10.

FIG. 17 is a transverse section taken along line 17—17 of FIG. 16.

DESCRIPTION OF THE PREFERRED EMBODIMENT

Figure 18:
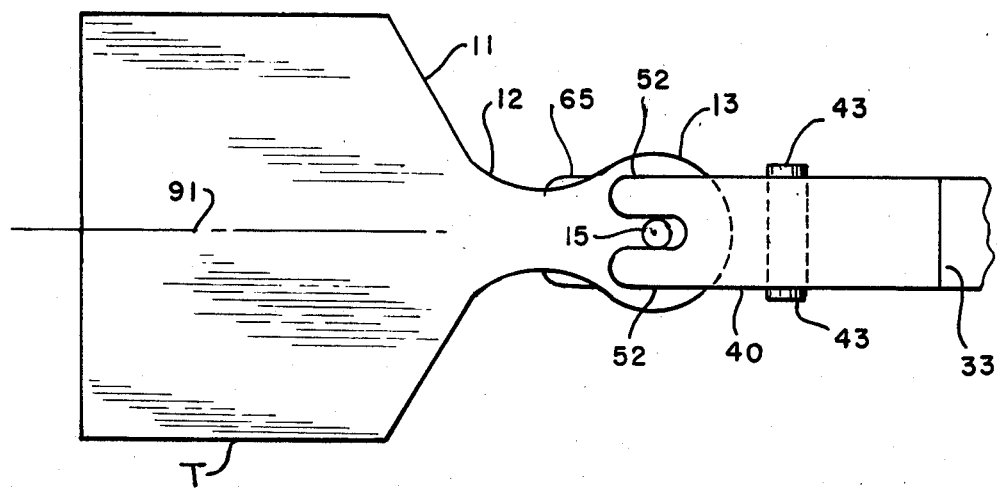
FIG. 18 is a fragmentary view of the tag receiving arm of the application, taken between the arms along line 18—18 of FIG. 10 and showing the tag mounted in an axially or endwise extending position.

As illustrated in FIG. 1 of the drawings, a tag T of this invention may be attached by a pin P to an ear 10 of the head H of an animal such as a steer, cow, calf, sheep or a member of ths swine family. The tag T, as in FIG. 2, is adapted to abut the ear 10, while the relative size of the tag may decrease as the size of the animal decreases. Each of the pin P and tag T is an improvement over the pin and the tag of U.S. Pat. No. 3,260,007. Thus, the tag includes a body 11 on which a numeral or other identifying indicia may be placed, with a neck 12 tapering upwardly at each side to an annular head 13 from which a socket 14 extends outwardly at a central position. A central axial hole 15 leads to an outer well 16, for a purpose described later. The pin P, utilized with the tag T of this invention, may be similar to the type shown by the aforesaid U.S. Pat. No. 3,260,007, in order to overcome the disadvantages thereof through ventilation by outside air through the construction of tag T, in accordance with this invention, which produces faster healing of the wound produced by penetration of the ear by the pin. However, the preferred construction of the pin, in accordance with this invention, as in FIGS. 2 and 6, include a conical point 17 and a stem 18 which are formed of a hard plastic, such as glass filled nylon, while stem 18 is attached to a base 19. As the pin point 17 is pushed through the ear and into the hole 15 of the tag, it will expand the socket 14, then permit the socket to retract as soon as the point 17 reaches the well 16, in which the base of the conical point is seated to prevent withdrawal of the pin. At that time, a portion of stem 18 will occupy hole 15, as in the position of FIG. 2. Pin P may be installed by an applicator similar to that of the aforesaid U.S. Pat. No. 3,260,007, but preferably including improvements in accordance with this invention, as exemplified in FIGS. 9-17.

A disadvantage of making the entire pin P of hard plastic in order to provide a conical point which is sufficiently hard and a stem which is sufficiently strong to penetrate the ear and engage socket 14, is that a base 19 of the tag, when made of hard plastic, will rub against the side of the ear and thereby rub a sore spot on the ear, which may become infected. However, the tag T, which engages the opposite side of the ear, does not produce the same effect, since it is formed of a relatively soft plastic material, such as polyurethane. Thus, the base 19 of the pin is formed of a soft plastic, in accordance with this invention, as described later.

In accordance with this invention, as shown in FIGS. 3–5, a series of troughs 20, such as three, extend radially inwardly from the periphery of head 13 to the inside of hole 15, as well as from the area of neck 12, with the troughs 20 being equally spaced and being separated by ridges 21 which abut the ear of the animal, as will be evident from FIG. 2. As shown, troughs 20, as well as ridges 21, are disposed 120° apart, although the number and spacing of the troughs and ridges may vary from that shown. Preferably, the outer edge of one trough is centered on neck 12 to insure air flow to the bottom of the area around hole 15, with the opposite ridge 21 centered at the upper end of head 13. Thus, with the three troughs and ridges shown, the centers of the remaining two troughs will be at 60° from upper center. The oblique top plan of FIG. 4 is a view looking directly into the trough 20 of FIG. 3, the center of which is located 60° to the right of upper center thereof. Each ridge 21 narrows as it approaches the center hole 15, so that each trough 20 which flanks it, will have a width, at the hole 15, approaching the diameter of the hole. The inner end 22 of each ridge 21 may occupy a minimum portion of the circumference of the hole, as in FIGS. 4 and 5, and the end 22 may slant outwardly to provide additional space around hole 15. Between the bottom of each trough 20 and the crest of each ridge 21, the lateral contour may curve smoothly, as in FIG. 4, to form undulations. Thus, the troughs 20 provide ventilation to the area of the ear 10 which is penetrated by pin P upon installation, i.e. around the stem 18 where the conical point 17 has pushed through the skin and perhaps wedged outwardly a circle of flesh. The presence of the troughs 20, which occupy only a portion of the periphery of the head 13 and the circumferential extent as well as the width of which may vary from that shown, insures that air for ventilation of the wound produced by penetration of the pin through the ear will not only assist in curing the wound but also act to deter or prevent an infection which is sometimes produced with such a type of ear tag.

As stated previously, the base 19 of the pin is formed of a soft plastic, conveniently the same material, such as polyurethane, as that utilized in making the tag T and is molded directly onto the stem 18, around a button 24 of the stem which extends laterally outwardly within the base 19. The diameter of button 24 exceeds the diameter of the larger end of the conical point 17 and preferably to at least the amount shown in FIG. 6. It has been found that a button of smaller diameter may permit the pin P to pivot in the softer plastic of the base, as when the animal suddenly moves its head, with the result that the point of the pin misses the hole in the tag. This effect is produced by a pin used with an applicator which moves the pin in an arc, as does the applicator shown by FIGS. 9-17 and described later. A groove 25 extends around the stem adjacent the button 24 and four or other suitable number of holes 26, such as oval, extend through the button, as in FIG. 7, in order to improve the attachment of the softer plastic of base 19 to the stem and to insure the maximum amount of soft plastic engaging the ear of the animal. Conveniently, the underside of button 24 may be convex at 27, opposite stem 18, while the periphery of the base 19, generally outwardly from the button 24, may be provided with annular sides 28 which taper outwardly toward each other.

Point 17, stem 18 and button 24 of the pin P may be molded in a tag T' of FIG. 7, corresponding in size and shape or differing from tag T of FIG. 1 but shown in FIG. 7 as having a corresponding neck 12' extending to a pin base 19' which is integral with the remainder of the tag. Except where joined to neck 12', base 19' is similar to base 19 of the pin of FIG. 5, while button 24 and the remaining parts, i.e. the conical point 17, stem 18 and groove 25, may be the same as shown in FIG. 6.

An alternative ventilation construction of the tag, shown in FIG. 8, may be utilized under appropriate circumstances, by providing a larger well 16' in socket 14' and a larger hole 15' leading to the socket well, although the clearance is not necessarily as great as shown in FIG. 8. With only a slight clearance, such as a diameter of 0.185 inch for a longer stem 18' and a diameter of 0.218 inch for the hole 15' leading to the socket, as well as a diameter of about 0.290 inch for the larger end of cone 17 of pin P and about 0.312 inch for well 16' of socket 14', stem 18' of the pin can move in hole 15', while cone 17 can move in well 16'. This clearance also permits the tag to move around the pin and thus keep the passages clear as well as permitting air to pass through to hole 15' and to the wound area adjacent the inner edge of hole 15'.

The tag T of this invention may be produced by injecting the plastic into a mold cavity having essentially the same size and shape as the tag, with allowance for shrinkage, with the mold being separable longitudinally into two halves, i.e. around the edges of the tag, for removal of the completed tag. Conveniently, a plunger which pushes the completed tag out of one half of the mold, may be cylindrical and engage the outer end of the boss 14, so as to push the tag off the pins by which the hole 15 and well 16 are produced. Additional ejection pins may engage appropriate spots on the body 11 of the tag.

The composite pin of this invention may similarly be produced in a split mold but having movable inserts which initially form the button 24 and groove 25 when hard plastic, such as glass filled nylon, is injected into the mold, as at the button, but are then withdrawn to leave a cavity corresponding to base 19, after which a softer plastic, such as polyurethane, may be injected into the base-forming cavity. The alternative, of course, would be to form the conical point 17, stem 18, button 24 and groove 25 of hard plastic and then insert the stem and button into a mold cavity in which the base 19 is formed. However, this latter is especially time consuming and thus considerably more expensive than the molding of the pin in one mold cavity. Boy, Farrel, McNeil, Nissei and Van Dorn molding machines have been found to be suitable for this purpose. When the pin is incorporated in a second tag, such as tag T' of FIG. 7, a similar mold may be utilized, except that the cavity for forming the tag is similar to the portion of a mold cavity in which the neck 12 and body 11 of tag T are formed.

An applicator, by which the pin and tag are held and then the pin thrust through the ear of the animal to lock the pin to the tag with the stem of the pin remaining in the ear, may be constructed in accordance with this invention, such as applicator A illustrated in FIGS. 9-17. As shown in FIGS. 9 and 10, an applicator A, similar to a pair of pliers and often referred to as pliers, is provided with an arm 32 adapted to carry the pin P, as in FIG. 9, and an opposed arm 33 adapted to carry the tag T. Arm 32 is moved by a handle 34 and arm 33 is moved by a handle 35, with a pivot ring 36 of FIG. 9 connecting arm 33 with handle 35 and an opposed, corresponding pivot ring 37, shown in FIGS. 14 and 15, connecting arm 32 with handle 34. A pin 38 extends through an appropriate hole in each of the opposed rings 36 and 37, as described later. After the pin and tag have been placed on opposite sides of the ear and the ear 10 disposed in the space between the pin P and tag T, with the applicator in the position of FIG. 10, handles 34 and 35 may be moved toward each other, so that arms 32 and 33 will pivot about pin 38, from the position of FIG. 10 to the position of FIG. 9 and pin P will be thrust through the ear of the animal and into socket 14 of the tag, so that cone tip 17 will seat in well 16.

Pin P is retained on arm 32 by a clip 39 and tag T is retained on arm 33 by a corresponding clip 40. Clip 39 has an angular flange 41 at each side and is pivoted on a pin 42 which extends through each flange adjacent the inner edge of the latter, pin 42 conveniently being a spring type pin, i.e. in a hollow rolled form with a longitudinal slot and formed of resilient material with the ends turned outwardly to clamp against the respective flange 41. Similarly, clip 40 for tag T is provided with a flange 42 at each side, each of which is pivoted on a pin 44, which extends through the arm 33 adjacent the inner surface thereof and may be formed in the same manner as pin 42. A slot 46 in the front end of clip 39, as in FIG. 12, accommodates stem 18 of pin P and preferably has a width a few thousandths of an inch greater than stem 18 of the pin so as to center the pin. A pair of tabs 47 of clip 39 engage the base 19 of the pin, on each side of slot 46. A punched offset 48 at the opposite end of clip 39, as in FIG. 12, engages one end of coiled spring 49 of FIG. 10, which urges the tabs 47 of the clip against the base of the pin, while a well 50 of FIG. 14 receives the opposite end of spring 49. A slot 51 in the outer end of clip 40, shown in FIG. 13, has sufficient width to clear the base of cone tip 17 of pin P as it moves into the socket of the tag, while a pair of tabs 52 engage the inner surface of head 13 of the tag on each side of slot 51. Similar to clip 39, a punched offset 53 in the opposite end of clip 40 engages one end of a spring 54, the opposite end of which is received in a well 55 of FIG. 16. To accommodate flanges 41 of clip 39, a pair of oppositely disposed grooves 56 of FIG. 14 extend downwardly from the upper edge of arm 32 past a transverse hole 57, shown in dotted lines and through which pin 42 of FIGS. 9 and 10 extends, while a corresponding pair of grooves 58 of FIG. 16 extend upwardly, on each side, from the lower edge of arm 32 past a similar transverse hole 57, through which pin 44 extends, to accommodate flanges 43.

Figure 19:
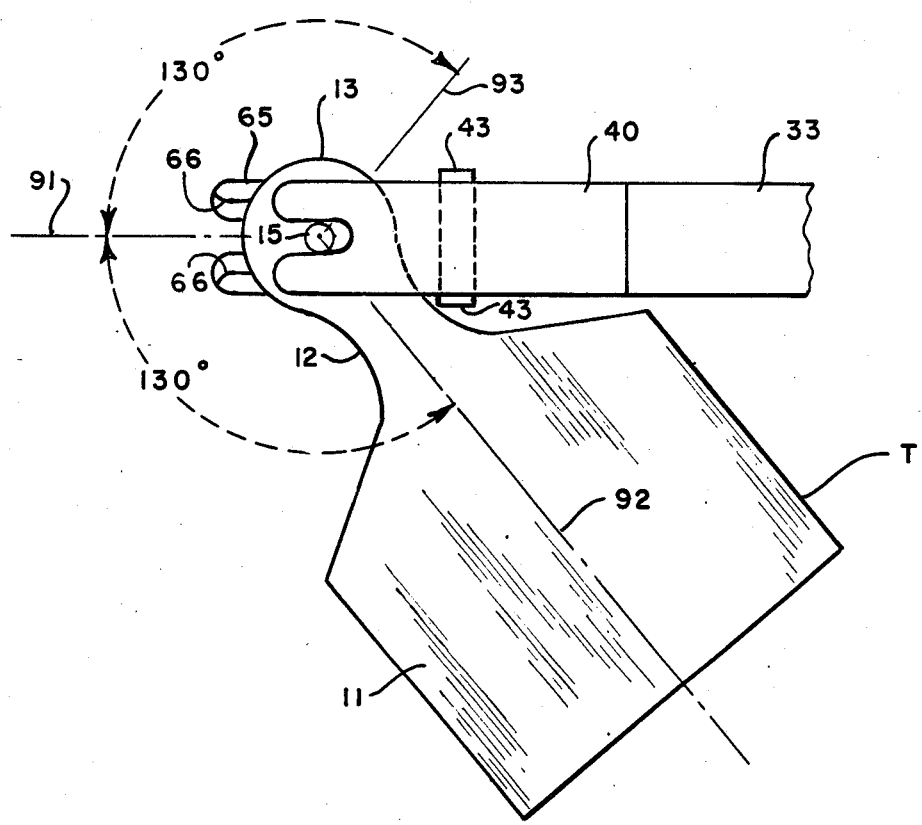
FIG. 19 is a view similar to FIG. 18, but showing the tag shifted for 130 degrees to one side of the arm and indicating the axis of the tag when shifted 130 degrees to the opposite side of the arm.

The outer end of arm 32, as in FIGS. 11, 12 and 14 and in accordance with the invention, is provided with a platform 60 on which the base 19 of pin P rests and against which the pin is held by clip 39. The front end of platform 60 is open, as shown, while a wing 61 extends laterally frome each side of arm 32 to enlarge the width of the platform. A rim 62 at each side facilitates the placement of the pin on the platform, the distance between the rims being greater than the diameter of head 13 of the pin, while an arcuate curved rear wall 63 may be positioned so that when the edge of head 13 engages the rear wall, the pin will be centered longitudinally, the lateral centering of the pin by tabs 47 of clip 39 being described previously. As in FIGS. 11 and 16, the outer end of arm 33 is provided with a slot 64 which accommodates movement of the pin through the tag socket and thus has a width approximately the diameter of well 16 in socket 14. Spaced from the underside of arm 33 a distance corresponding to the height of socket 14 of tag T, is a ledge 65 against which the end of socket 14 abuts, to resist the thrust of the pin P through the hole 15 in the tag and into the well 16. The remainder of head 13 abuts a rimless planar surface or platform 67 on the underside of arm 33, shown more clearly in FIG. 14, while the tag is retained by clip 40. The inner edge of a wall 66 of the groove formed above ledge 65, as in FIG. 16, may be positioned so as to be abutted by socket 14 and thereby position the tag socket in alignment with pin P. Wall 66 terminates in planar surface 67 at a position spaced from the inner edge of that surface and also spaced further from flanges 43 of clip 40, which are spaced longitudinally from surface 67 toward pivot pin 38. It will be understood that, although the parts associated with arms 32 and 33 are described with reference to the top and bottom, or underside, of each arm, these terms are only relative and are based upon the position in which the parts of the applicator are shown in FIGS. 9 and 10. Thus, it will be understood that, when the applicator A is utilized to install a tag in the ear of an animal, as in FIG. 1, the applicator may be held in a vertical position, with the handles 34 and 35 upright and beneath the ear, as well as in a horizontal position or any angle between vertical and horizontal, with the tag in an appropriate position. The platform 67 of FIG. 14, engaged by head 13 of the tag, has no rim corresponding to rim 62 of the platform for pin P. Thus, this surface permits the tag to be shifted to different radial positions, such as considerably beyond a 90° position at each side, i.e. between abutment of an edge of the tag against flange 43 at one side or the other. In the actual construction, a large tag can be shifted to an angle of 130° past center in each direction, or a total of 260°. In FIG. 18, a tag T is shown mounted on arm 33 with its longitudinal axis 91 extending in the same direction as the longitudinal axis of arm 33. In FIG. 19, a tag T is shown as installed to one side of arm 33, through rotation of socket 14 of FIGS. 2, 4 and 5 in the end of the groove formed by wall 66 of FIGS. 10 and 11, so that the axis 92 of the tag is 130 degrees from the axis 91 of the tag when installed as in FIG. 18. In FIG. 19, an axis 93' of the tag is indicated when the tag is installed to the opposite side of the arm, with axis 93 again being 130 degrees from axis 91 of the tag when installed as in FIG. 18. Thus, the tag may be positioned so that it will permit the applicator to be held in a convenient position, rather than attempting to hold it in an awkward position, when the position of the ear is such that the tag, in a position extending longitudinally from the applicator, is difficult to attach to the ear. The situation also arises that tagging may be done through the bars of a chute and it is awkward to shift the tool to a position in which the tag is easily attached. By shifting the tag on the applicator, placement of the tag is often rendered considerably less awkward, which is important when a large number of tags are to be applied to a number of animals in succession from the same position.

Additional parts of the applicator include a spring 69 which extends between abutments 70 and 71 of handles 34 and 35, respectively, to urge apart the handles and therefore the respective arms 32 and 33. The opposite ends of spring 69 may be received in a well 72 in handle 34 and a well 73 in handle 35, each of these wells being shown in dotted lines in FIG. 10. Pin 38 of FIGS. 9 and 10 extends through a hole 75 in ring 36 of FIG. 17 and a hole 76 in ring 37 of FIG. 15. When the rings 36 and 37 are interfitted together, pin 38 may be inserted into the holes 75 and 76, aligning these holes as it does so. One end of pin 38 may be conveniently provided with a flange adapted to engage a countersink 77 at the outer edge of either hole 75 or 76 with the opposite end of pin 38 having a conventional slot or groove into which a conventional split retaining ring may be spread by a conventional tool for insertion, the retaining ring being accommodated by the opposite countersink 77. An annular groove 78, on the inside of each ring 36 and 37, as in FIGS. 15 and 17, accommodates a conventional bowed spring washer which maintains a slight clearance between rings 36 and 37, thereby increasing the ease with which the applicator may be operated. For more accurate interfitting of the two halves of the applicator together, arm 32 may be provided with an arcuate surface 79 and handle 34 with an opposed arcuate surface 80, for encircling opposed arcuate portions of ring 36, as in FIGS. 9 and 10, while arm 33 may be provided with an arcuate surface 81 of FIG. 17 and handle 35 with an arcuate surface corresponding to surface 79 but in opposed position to surface 80, for encircling opposed arcuate portions of ring 37. To limit the opening movement of the arms and handles, an abutment 83 may be formed at the rear edge of surface 79 of handle 34 and an abutment 84 on handle 35, while an abutment 85 may be formed at the front edge of arcuate surface 80 and an abutment 86 on arm 33. when moved to the open position of FIG. 10, abutments 83 and 84 and abutments 85 and 86 will be in engagement, as shown, with the plane of platform 60 of arm 32 and the plane of surface 67 of arm 33 being divergent in a direction outwardly from the axis of center pin 38. For limiting closing movement of the arms and handles, abutments 87 and 88 may be formed on arms 32 and 33, respectively, so that these abutments will engage when the applicator is moved to the closed position of FIG. 9, as shown, with the planes of platform 60 of arm 32 and surface 67 of arm 33 being convergent in a direction outwardly from the axis of center pin 38. This relationship enables the length of the pin to be proportioned, as shown in FIG. 10, so that the planes of platform 60 and surface 67 will be essentially parallel when the point of the pin reaches an ear having a thickness on the order of $\frac{1}{2}$ inch to $\frac{3}{8}$ inch. The relative position of abutments 83 and 86 are shown in FIGS. 15 and 17, respectively, of abutments 85 and 87 in FIG. 14 and of abutments 84 and 88 in FIG. 16.

As will be evident the applicator of this invention requires only that the pin and tag be placed in position, the arms of the applicator placed over the ear or the like of the animal and the handles squeezed together, whereupon the applicator may be slipped off the tag. This ease in use contrasts with those applicators having a stem attached to one jaw, which reinforces the pin, but which requires the applicator to be fully opened again, after closing, before it can be removed.

Although a preferred embodiment of a pin, tag and applicator of this invention have been illustrated and described and additional embodiments also illustrated and described, it will be understood that other embodiments may exist and variations thereof used, without departing from the spirit and scope of this invention.

What is claimed is:

1. An animal identification tag for use with an attachment device having a stem surmounted by a generally conical member and having means for penetrating an ear or other portion of an animal for attaching said tag to said portion of said animal, comprising:
- a body having at least one area on which indicia may be placed;
- a socket extending laterally from said body and having a well adjacent the outer end of said socket, said body and socket having a hole communicating with said well and through which said generally conical member of said attachment device may be moved, after penetration of said animal with the side thereof opposite said socket being adapted to abut said portion of said animal; and
- a plurality of passageways formed by an undulating configuration of the surface of said side of said tag opposite said socket for permitting a flow of outside air to the area of said animal around said stem of said attaching device with said side of said tag opposite said socket abutting said portion of said animal.

2. An animal identification tag as defined in claim 1, wherein:
said passageways extend in a radial direction toward said hole which communicates with said well.

3. An animal identification tag as defined in claim 1, wherein:
said passageways are formed by circumferentially spaced troughs extending radially toward said hole and disposed between ridges adapted to abut said ear of said animal.

4. A device for attaching an animal identification tag to an ear or similar portion of the body of an animal, through mounting on one arm of a pair of arms of an applicator having pivoted handles for moving said arms to engage receiving means mounted on the opposite arm, including:
- a rearwardly tapering point on the end of a stem, the larger end of said point having a greater diameter than said stem, whereby said point and stem may be moved through an ear or the like of an animal and into engagement with said receiving means which is then retained on the opposite side of said ear or the like by said attaching device;
- said point and said stem being formed of relatively hard material;
- a base extending transversely to said stem and having at least a layer of softer material than said stem adapted to contact the ear or the like of said animal;
- a button integral with said stem at the opposite end from said tapering point and formed of said relatively hard material, said button having a lateral dimension greater than said larger end of said point and provided with holes extending therethrough outwardly from said stem; and
- said softer material being molded around and enclosing said button and filling said holes.

5. An attachment device as defined in claim 4, wherein said relatively hard and said softer material each comprise a plastic.

6. An attachment device as defined in claim 5, wherein:
said stem is provided with an annular groove adjoining said button, said softer plastic material filling said groove.

7. An attachment device as defined in claim 4, wherein:
the area of said button opposite said stem is generally convex.

8. An attachment device as defined in claim 4, wherein:
said base is generally circular.

9. An attachment device as defined in claim 4, wherein:
- said relatively hard and said softer material re each formed of a plastic:
- said base is generally circular;
- said stem is provided with an annular groove adjoining said button, said softer material filling said groove; and
- the area of said button opposite said stem is generally convex.

10. An attachment device as defined in claim 4, wherein:
said base comprises a portion of a tag having at least one surface for the placement of indicia.

11. An applicator for installing an identification device in an ear or the like of an animal, said device including pin means having a stem provided with an annular base at one end and a conical point at the opposite end, the larger end of said conical point being greater in diameter than said stem, and tag means having a head and an outside cylindrical socket of smaller lateral dimensions, said head being provided with a hole through which said conical point and stem may be moved and said socket having a well for receiving said conical point, said applicator comprising:
- a pair of arms, each connected to a handle and pivotally mounted so that said arms may be pivotally moved between generally open and generally closed positions by said handles;
- one of said arms having at its outer end a platform for receiving the base of said pin means and resiliently urged clip means for holding said pin means on said platform, said platform having abutment means for said base of said pin means for positioning said stem and conical point longitudinally and said clip means having a slot for positioning said stem and point laterally;
- the opposite arm having a rimless surface engageable by said head and a longitudinal slot opposite said rimless surface into which said conical point may extend if moved axially past said socket, abutment means for the axial end of said socket of said tag means, a second longitudinal slot for positioning said socket laterally relative to said conical point and clip means for holding said head against said rimless surface; and
- said rimless surface for engaging said head of said tag permits a tag to be placed on said surface at different angular positions for approximately 260 degrees.

12. An applicator as defined in claim 11, wherein:
said abutment means engaging said axial end of said socket comprises a ledge extending along the sides and the end of said slot and said means for positioning said socket comprises a wall, extending perpendicularly to said ledge and intersecting said rimless surface.

13. An applicator as defined in claim 11, wherein:
said clip means for holding said head against said rimless surface is pivoted at a position spaced longitudinally from said rimless surface in a direction toward said pivotal mounting of said arms.

14. An applicator for installing an identification device in an ear or the like of an animal, said device including pin means having a stem provided with an annular base at one end and a conical point at the opposite end, the larger end of said conical point being greater in diameter than said stem, and tag means having a head and an outside cylindrical socket of smaller lateral dimensions, said head being provided with a hole through which said conical point and stem may be moved and said socket having a well for receiving said conical point, said applicator comprising:
- a pair of arms, each connected to a handle and pivotally mounted so that said arms may be pivotally moved between generally open and generally closed positions by said handles;
- one of said arms having at its outer end a platform for receiving the base of said pin means and resiliently urged clip means for holding said pin means on said platform, said platform having abutment means for said base of said pin means for positioning said stem and conical point longitudinally and said clip means having a slot for positioning said stem and point laterally;
- the opposite arm having a rimless surface engageable by said head and a longitudinal slot opposite said rimless surface into which said conical point may extend if moved axially past said socket, abutment means for the axial end of said socket of said tag means, abutting means for positioning said socket relative to said conical point and clip means for holding said head against said rimless surface; and
- said arms are constructed and arranged so that the plane of said platform of said one arm diverges from the plane of said rimless surface of said opposite arm in a direction away form the pivotal axis of said arms when said arms are apart prior to installing said identification device; and
- the planes of said platform and said rimless surface are convergent in a direction away from said pivotal axis when said arms are in closed position.

15. An applicator for installing an identification device in an ear or the like of an animal, said device including pin means having a stem provided with a base at one end having an arcuate periphery or an arcuate portion at its inner edge and a conical point at the opposite end, the larger end of said conical point being greater in diameter than said stem, and tag means having a head and an outside cylindrical socket of smaller lateral dimensions, said head being provided with a hole through which said conical point and stem may be moved and said socket having a well for receiving said conical point, said applicator comprising:
- a pair of arms, each connected to a handle and pivotally mounted so that said arms may be pivotally moved between generally open and generally closed positions by said handles;
- one of said arms having at its outer end a platform for receiving the base of said pin means and resiliently urged clip means for holding said pin means on said platform, said platform having a rear wall on the platform for engaging an arcuate portion of said base to position said stem and conical point longitudinally, said rear wall having sides for guiding said base for positioning on said platform and said clip means having a slot for positioning said stem and point laterally;
- the opposite arm having a rimless surface engageable by said head and a longitudinal slot opposite said rimless surface into which said conical point may extend if moved axially past said socket, abutment means for the axial end of said socket of said tag means, a second longitudinal slot for positioning said socket laterally relative to said conical point and clip menas for holding said head against said rimless surface.

16. The combination of claim 15, wherein:
- said arms of said applicator are constructed and arranged so that the plane of said platform of said one arm diverges from the plane of said rimless surface of said opposite arm in a direction away from the pivotal axis of said arms when said arms are apart prior to installing said identification device; and
- the planes of said platform and said rimless surface are convergent in a direction away from said pivotal axis when said arms are in closed position.

* * * * *